US006167333A

United States Patent [19]

Gehlot

[11] Patent Number: 6,167,333

[45] Date of Patent: Dec. 26, 2000

[54] HIGHWAY INFORMATION SYSTEM

[75] Inventor: Narayan L. Gehlot, Sayreville, N.J.

[73] Assignee: Lucent Technologies Inc., Murray Hill, N.J.

[21] Appl. No.: 09/377,670

[22] Filed: Aug. 19, 1999

[51] Int. Cl.[7] .......... G06F 15/21

[52] U.S. Cl. .......... 701/35; 701/36; 701/33; 340/901; 340/436; 342/357

[58] Field of Search .......... 701/35, 36, 33, 701/24; 340/901, 436, 200; 342/357

[56] References Cited

U.S. PATENT DOCUMENTS

| | | | |
|---|---|---|---|
| 4,303,904 | 12/1981 | Chasek | 235/384 |
| 4,829,434 | 5/1989 | Karmel et al. . | |
| 5,086,389 | 2/1992 | Hassett et al. | 705/13 |
| 5,357,438 | 10/1994 | Dadidian . | |
| 5,432,509 | 7/1995 | Kajiwara . | |
| 5,465,079 | 11/1995 | Bouchard et al. . | |
| 5,485,520 | 1/1996 | Chaum et al. | 380/24 |
| 5,546,311 | 8/1996 | Sekine . | |
| 5,570,087 | 10/1996 | Lemelson . | |
| 5,574,641 | 11/1996 | Kawakami et al. . | |
| 5,663,546 | 9/1997 | Hayashi et al. | 235/384 |
| 5,663,548 | 9/1997 | Hayashi et al. . | |
| 5,694,116 | 12/1997 | Kojima . | |
| 5,709,281 | 1/1998 | Sherwin et al. . | |
| 5,717,606 | 2/1998 | Hara et al. . | |
| 5,745,031 | 4/1998 | Yamamoto . | |
| 5,815,070 | 9/1998 | Yoshikawa . | |
| 5,819,234 | 10/1998 | Slavin et al. | 705/13 |
| 5,821,860 | 10/1998 | Yokoyama et al. | 340/576 |
| 5,847,661 | 12/1998 | Ricci . | |
| 5,874,892 | 2/1999 | Antonellis et al. . | |
| 5,878,156 | 3/1999 | Okumura . | |
| 6,012,002 | 1/2000 | Tapping et al. | 701/25 |

*Primary Examiner*—William A. Cuchlinski, Jr.
*Assistant Examiner*—Olga Hernandez
*Attorney, Agent, or Firm*—Stroock & Stroock & Lavan LLP

[57] ABSTRACT

The present invention relates to a system for receiving, processing, and storing real-time data from various types of input, including but not limited to information from a vehicle's micro-processing systems, a driver information card, a vehicle information card, and physical attributes of the driver/owner. In addition, the collected data is then transmitted to various entities via a Highway Information System which may include networked sensors to receive the collected data and processors to process the data. The processors may be capable of downloading the collected data to a data storage unit whereby various entities can access the data. In the alternative, the processors may also be capable of automatically transmitting the collected data directly to the various entities via wireless transmission.

32 Claims, 6 Drawing Sheets

HIGHWAY INFORMATION SYSTEM

FIELD OF INVENTION

This invention relates to a system for collecting vehicle data and driver data and transmitting the collected data to networked data receivers whereby the collected data can be transmitted to external entities and devices.

BACKGROUND OF THE INVENTION

Over 4,000 micro-processors currently operate the systems of a modern vehicle. Such micro-processors are currently used to control important vehicle systems, such as the ignition system, the fuel mixture and flow, the transmission system, and anti-lock braking systems. Each system is prone to malfunction, which may result in poor performance or complete breakdown of the vehicle. Upon such a malfunction, repair shops must subject the vehicle's systems to a series of diagnostic tests to locate the problematic system, thereby increasing the cost of repairs and maintenance on the vehicle.

In addition, vehicle manufacturers spend a great deal of time and money researching and testing such systems and may not learn of poorly designed systems for many years. This delay decreases the ability of vehicle manufacturers to quickly and efficiently replace poorly designed systems and, eventually, leads to increased costs to consumers. Moreover, vehicle manufacturers would benefit from information, on a real-time basis, relating to how their vehicles are being driven, how their vehicles are performing with respect to, for example, gas mileage, brakes, accidents, parts replacements, etc. In addition, consumers can get first hand up to the minute information regarding vehicle performance before they purchase the vehicle. Such information allows manufacturers to design better, more efficient vehicles for realistic driving styles.

There are many other entities, in addition to the vehicle manufacturers, that would benefit from such collected information. For example, hospitals, insurance companies, the Department of Motor Vehicles (DMV), the Department of Transportation (DOT), law enforcement, environmental monitoring companies, and vehicle repair shops, to name a few.

Thus, there is a need for a Highway Information Network which is capable of receiving real-time data regarding operation of a vehicle's systems and driver's driving patterns and transmitting the same to various external entities and devices.

SUMMARY OF THE INVENTION

The present invention relates to a system for receiving, processing, and storing real-time data from various types of input, including but not limited to information from a vehicle's micro-processing systems, a driver information card, a vehicle information card, and physical attributes of the driver/owner. In addition, the collected data is then transmitted to various entities via a Highway Information System.

The Vehicle Data System for data collection (hereinafter referred to as the "Vehicle Data System" or "VDS") includes a processor mounted or otherwise installed in a vehicle. The processor (hereinafter referred to as the "Vehicle Data Processor" or "VDP") is capable of receiving data from the vehicle's various mechanical and electrical/electronic systems, micro-processing systems, information cards, and physical inputs. The data received can be processed and output to external sources as will be discussed below. In addition, the VDP controls the vehicle's ignition system and can prevent unauthorized persons from starting the vehicle. The VDS is preferably equipped with a transmitting device capable of alerting law enforcement authorities of possible theft or tampering with the data collection system. The VDS may be provided with a Global Positioning Satellite (GPS) unit giving law enforcement authorities the ability to track the vehicle. In a preferred embodiment, the user is prompted by the VDP to input some form of physical data, i.e., retinal scan, fingerprint, voice recognition, and to insert a driver and/or vehicle information card into a card reader/writer that is designed to work in conjunction with the VDP. The VDP matches the data to information stored in memory and grants authorization to the user. This method alleviates the problems associated with, for example, lost or misplaced keys. If the data does not create a match, the VDS will not permit the user to drive the vehicle. During the trip, the VDS constantly monitors the vehicle's systems and provides data regarding the operation of such vehicle. This data can be transmitted to law enforcement authorities, hospitals, the DMV, the DOT, or transmitted or sold to repair shops, car manufacturers, or other third-parties having an interest in the data a VDS can accumulate.

In particular, the collected data can be transmitted to the above-mentioned entities via a Highway Information System. Such a Highway Information System may include networked sensors to receive the data transmitted by the VDS as well as processors to process the data. The processors may be capable of downloading the collected data to a data storage unit whereby various entities can access the data. In the alternative, the processors may also be capable of automatically transmitting the collected data directly to the various entities via wireless transmission.

As will be discussed shortly, the Highway Information System of the present invention may be configured in a hierarchical manner whereby data relating to a small road can be collected and accessed as well as data relating to large interstate and international highways.

If, at any time, the VDP is tampered with or disabled, the VDS is provided with a radio transmitter or a transponder, used to alert law enforcement authorities of such tampering. In this way, the present invention prevents a potential theft from by-passing the VDS system.

It is envisioned that the system of the present invention would be desirable to many different entities, such as, for example, car manufacturers, repair shops, law enforcement authorities, environmental monitoring companies, the DMV, and insurance companies, to name a few. For example, the present invention will decrease vehicle thefts as well as any unauthorized use, thereby lowering insurance costs. Also, the present invention will provide vehicle manufacturers with valuable data about their vehicles, which may result in more efficient and reliable vehicles.

Other objects and features of the present invention will become apparent with the following detailed description, considered in conjunction with the accompanying drawing figures. It is to be understood, however, that the drawing, which are not to scale, are designed solely for the purpose of illustration and are not a definition of the limits of the invention, for which reference should be made to the appended claims.

BRIEF DESCRIPTION OF THE DRAWINGS

In the figures, which are not to scale, and are merely illustrative, and wherein like reference numerals depict like elements throughout several views.

DETAILED DESCRIPTION OF THE PREFERRED EMBODIMENTS

Figure 1:
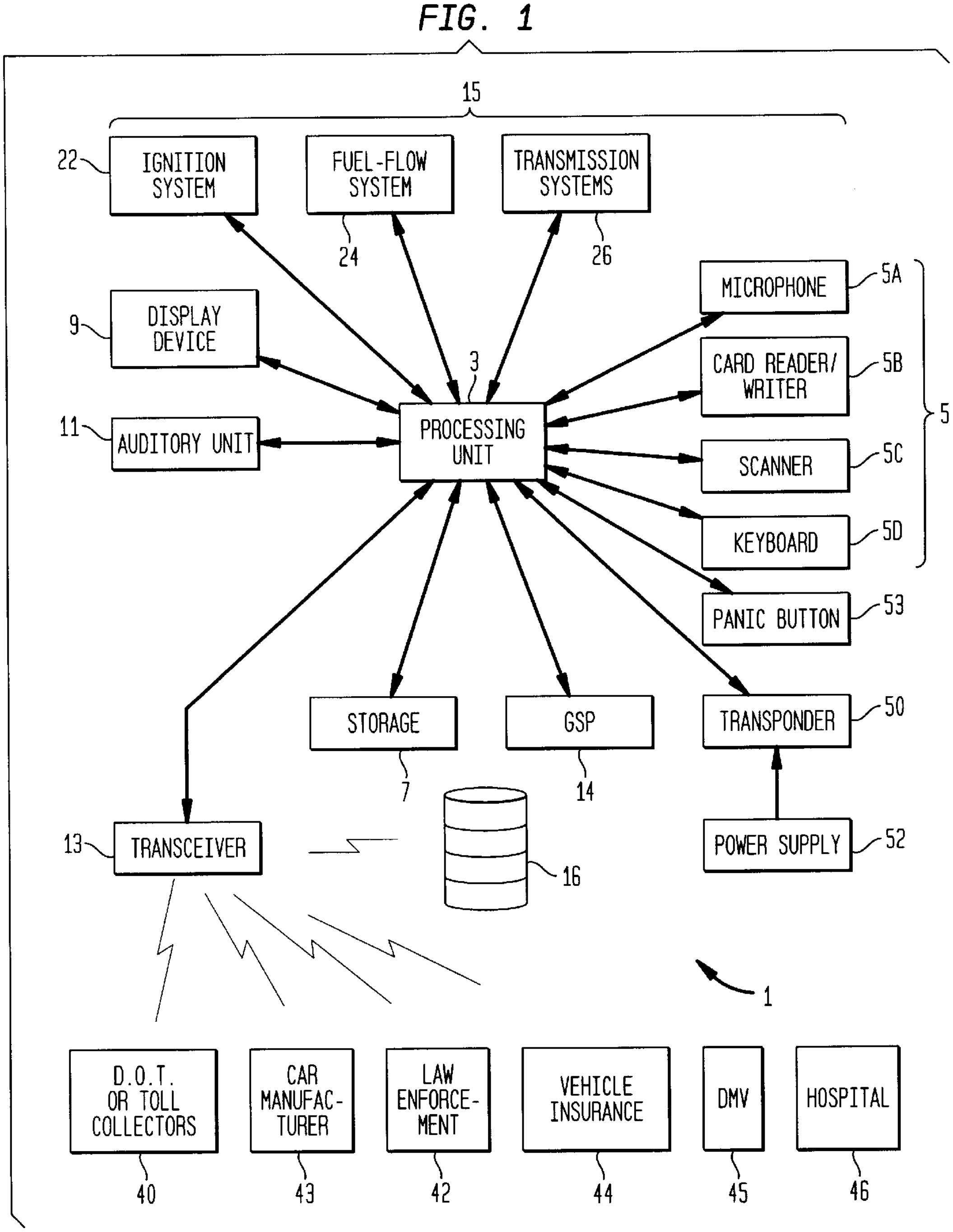
FIG. 1 is a system diagram of the Vehicle Data System of the present invention.

With reference to FIGS. 1–4, the vehicle data system ("VDS") 1, comprises a vehicle data processing unit ("VDP" or "vehicle processor") 3 for communicating and collecting data from various vehicle systems 15 and physical input devices 5, e.g., a microphone 5A for voice recognition, a card reader/writer 5B and a scanner 5C such as a hand or retinal scanner. Further, vehicle data system 1 is provided with an electronic data storage unit 7 for storing the collected data. The vehicle data system 1 is capable of collecting vehicle data and writing the collected data onto removable information cards 28, 30, 32, 34, as will be discussed shortly. The vehicle data system 1 can also compare newly entered physical data to physical data previously stored onto data storage unit 7 and allow the driver to drive the automobile if access is authorized. The vehicle data system 1 also provides the function of displaying relevant information to a display unit such as visual display unit 9 and auditory display unit 11 for communicating with a driver. The auditory display unit 11 may be coupled to the existing sound system. Information such as, for example, the status of the various vehicle systems 15 can be displayed. In addition, information as to whether access to the vehicle is authorized may be displayed. The vehicle data system 1 then sends the collected data to a card reader/writer 5B. The present invention also includes a transceiver 13 for communicating with external entities and devices. Accordingly, the collected data may be sent directly to the transceiver 13 for transmitting the collected data to several of the external entities previously discussed above. As used herein, the term vehicle is intended to include any means to transport people or things, such as any type of passenger car, van or sports utility vehicle, boats, planes, race cars, and any other type of commercial or non-commercial vehicle presently or hereinafter known. Furthermore, as used herein, the term vehicle systems 15 is intended to refer to those systems within a vehicle that are mechanical, or electrical, or those that may be controlled by a micro-processor of a type known in the art, such as, by way of non-limiting example, ignition systems 22, fuel flow and mixture systems 24, and transmission systems 26, to name a few.

Referring now to FIG. 1, there is shown a vehicle data system 1 for the collection of vehicle data and the storage of the collected vehicle data. This system includes a processing unit 3, input-output devices 5, vehicle systems 15, display devices 9 and 11, a storage device 7, and a transceiver 13. The processing unit 3 may be, for example, a software or firmware controlled processor or any other comparable type of unit for sending, retrieving and analyzing data, and controlling devices within the vehicle to initiate pre-programmed responses as a result of the analyzed data, such as, for example, a programmable micro-processor, micro-computer, mini-computer, a PLC-type controller, Application-Specific Integrated Circuit (ASIC) or the like.

Figure 2:
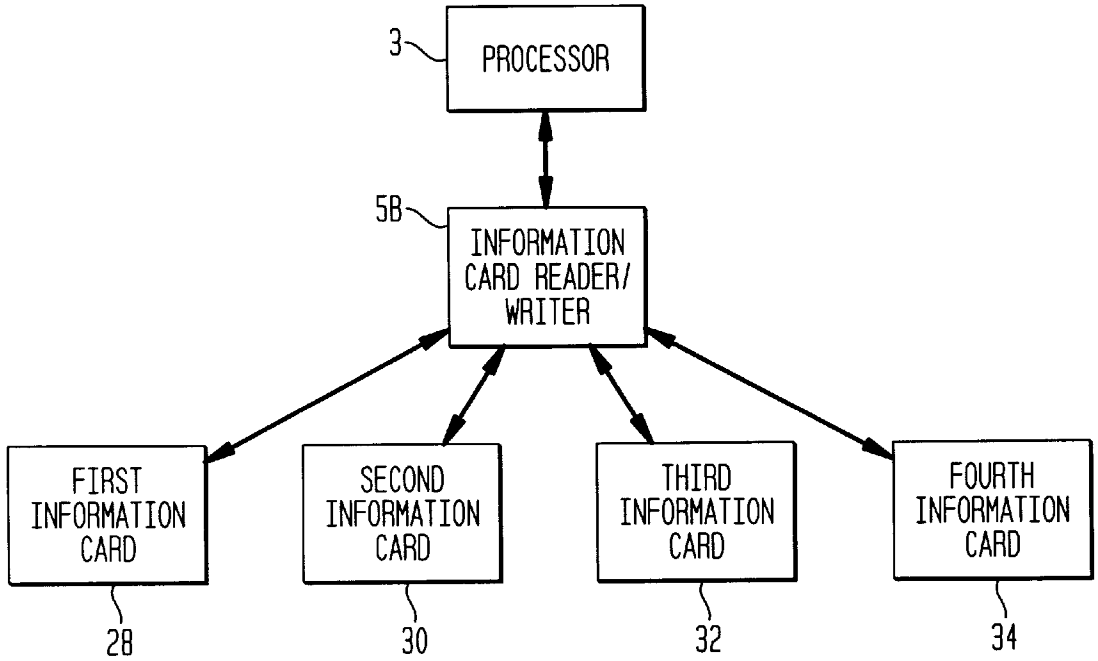
FIG. 2 is a system diagram of the Information Storage device Reader/Writer.

Referring to FIG. 2, one possible type of the input-output devices 5 from FIG. 1 is depicted. In particular, there is shown an information card reader/writer ("card reader") 5B. The card reader 5B is in communication with the processing unit 3. The processing unit 3 may receive data from input-output devices 5 such as the card reader 5B. In one embodiment of the invention, the card reader may read information from one or a plurality of information cards, such as a first information card 28, a second information card 30, a third information card 32, and a fourth information card 34. Information cards 28, 30, 32, 34 can be one of several types, such as, for example, Erasable Programmable Read-Only Memory (EPROM), bar coded cards, magnetic strip cards, Single In-Line Memory Module (SIMM), smart cards, etc. The first information card 28 can include information related to the driver of the vehicle, i.e. driver data. Such information may include, but is not limited to, information generally found on a state-issued driver's license, driving records, medical information, family/relatives information, and insurance information. Medical information, may include, for example, blood-type, medical history, emergency contact information, and the like. The second information card 30 can include information related to the vehicle itself, i.e. vehicle data. For example, the second information card may include, but is not limited to, the vehicle make, model, the VIN, vehicle registration information, vehicle inspection information, vehicle maintenance histories, vehicle repair histories, and the like. The third information card 32 can serve as a debit card to pay for highway, bridge and tunnel tolls, park entrance fees, and the like. The third information card 32 may include account balance information, i.e. how much money is on the debit card. The fourth information card 34 can serve as a passenger card to keep track of which passengers may be present in the vehicle at any time, or contain other information such as whether there are children in the vehicle, the driver's and passengers' blood types, emergency contact information, and the like. Essentially, the fourth information card 34 is similar to the first information card 28, except that the fourth information card 34 is to be used by passengers not drivers. One skilled in the art will realize, however, that any number of information cards containing information of any type, may be utilized.

The driver of the vehicle (and any passengers of the vehicle who may have the fourth information cards 34) would then have to download information from the information cards 28, 30, 32, 34 to the card reader 5B. The downloading of the information can take one of several forms. For example, the driver may swipe a card with a magnetic strip through a card reader 5B, insert a Smart Card into the card reader 5B or the like. Once the information from one or more of the information cards 28, 30, 32, 34 has been inputted, the processing unit 3 can retrieve the downloaded information from the card reader 5B.

Referring again to FIG. 1, the processing unit 3 is capable of retrieving vehicle data from the vehicle's systems. For example, the processing unit 3 may retrieve malfunction information such as that related to the ignition system 22, the fuel mixture and fuel flow system 24, the transmission 26, the anti-lock braking system, and the like. In addition, vehicle data such as average, maximum and minimum speeds driven, average fuel consumption, distance traveled, and the like may be retrieved from the vehicle's systems and/or calculated by the processing unit 3. This information may then be displayed on the visual display unit 9, the auditory display unit 11, or both.

Once the processing unit 3 receives the collected data, this information can be stored in a data storage device 7. Data storage device 7 may be, for example, a hard disk of the type known in the art or any other device capable of storing data for use by the processing unit 3.

In a preferred embodiment, the collected data would be linked to or associated with a specific driver, at the very least, based on the information retrieved from the first information card 28 and to the specific vehicle based on the information from the second information card 30.

Once the collected data is stored onto a data storage device 7, it is capable of being accessed by the processing unit 3 in order to display the collected data to the driver. The collected data may be displayed on a visual display device 9, an auditory display device 11, or both.

In addition, the collected data which is stored on the data storage device 7 can be outputted to the information cards 28, 30, 32, 34 via the input-output device 5 such as the card reader/writer 5B. Such outputted information may include automobile diagnostics, automobile efficiencies, driver's driving history, etc. Since the information cards 28, 30, 32, 34 are easily removable from the card reader/writer 5B, the information contained on the information cards 28, 30, 32, 34 can be easily transferred to many third-parties such as, for example, a central database 16, the Department of Transportation (DOT) 40, law enforcement 42, vehicle manufacturers 43, insurance companies 44, Division of Motor Vehicles (DMV) 45, and hospitals 46, to name a few. Insurance companies 44 would benefit from receiving the outputted information in that they would receive information not normally reported to insurance companies by drivers. For example, information such as running red lights and stop signs, vehicle self-repairs, speeding, etc. In addition, the DMV 45 would benefit by saving time, money, and effort by requiring that only vehicles which need to be inspected are inspected. For example, if the collected information relating to the brakes and the exhaust of the vehicle is satisfactory with the DMV 45, then the DMV 45 may not need to inspect the vehicle.

Furthermore, the collected data, instead of or in addition to being stored on the data storage device 7 which is internal to the vehicle, may be outputted to a Highway Information System which will allow third-party entities to either directly receive the collected data or retrieve the collected data from external data storage devices using the Highway Information System which will be discussed below in detail.

In the case of an accident, the VDS 1 may prompt the driver to speak into microphone 5A or respond in order to determine if the driver is all right. If the driver does not respond, the VDS 1 can alert the proper authorities, call the nearest hospital, provide vehicle location, provide medical records, etc.

Figure 3:
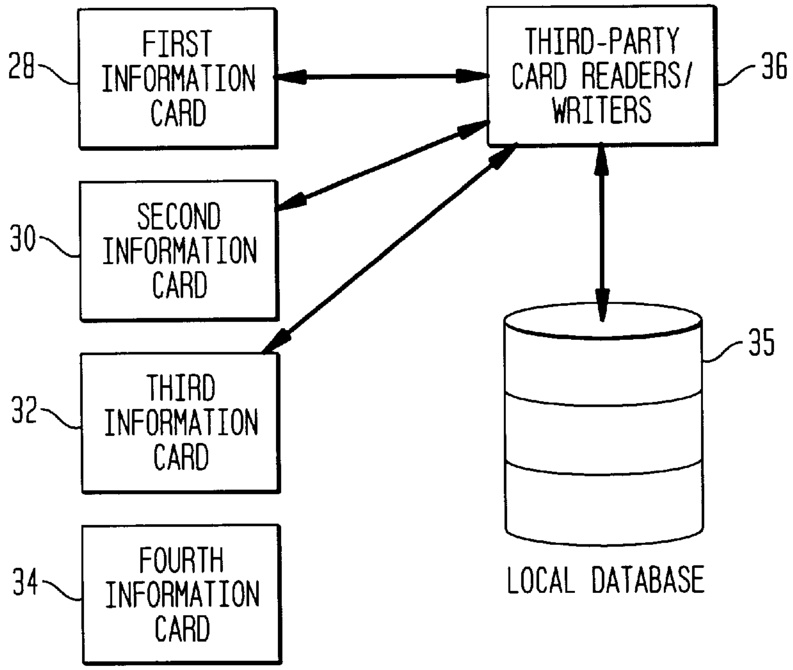
FIG. 3 is a system diagram of a Third-Party Card Reader.

Referring now to FIG. 3, there is shown a third-party card reader/writer 36 that may receive the input of information cards 28, 30, 32, 34. In addition, the third-party card reader/writer 36 may write relevant information onto the information cards 28, 30, 32, 34 such as, for example, the date for the next oil change or the DMV may update the driver's driving record, etc. Information received by the third-party card reader/writer 36 can also be downloaded to a local database 35.

Figure 4:
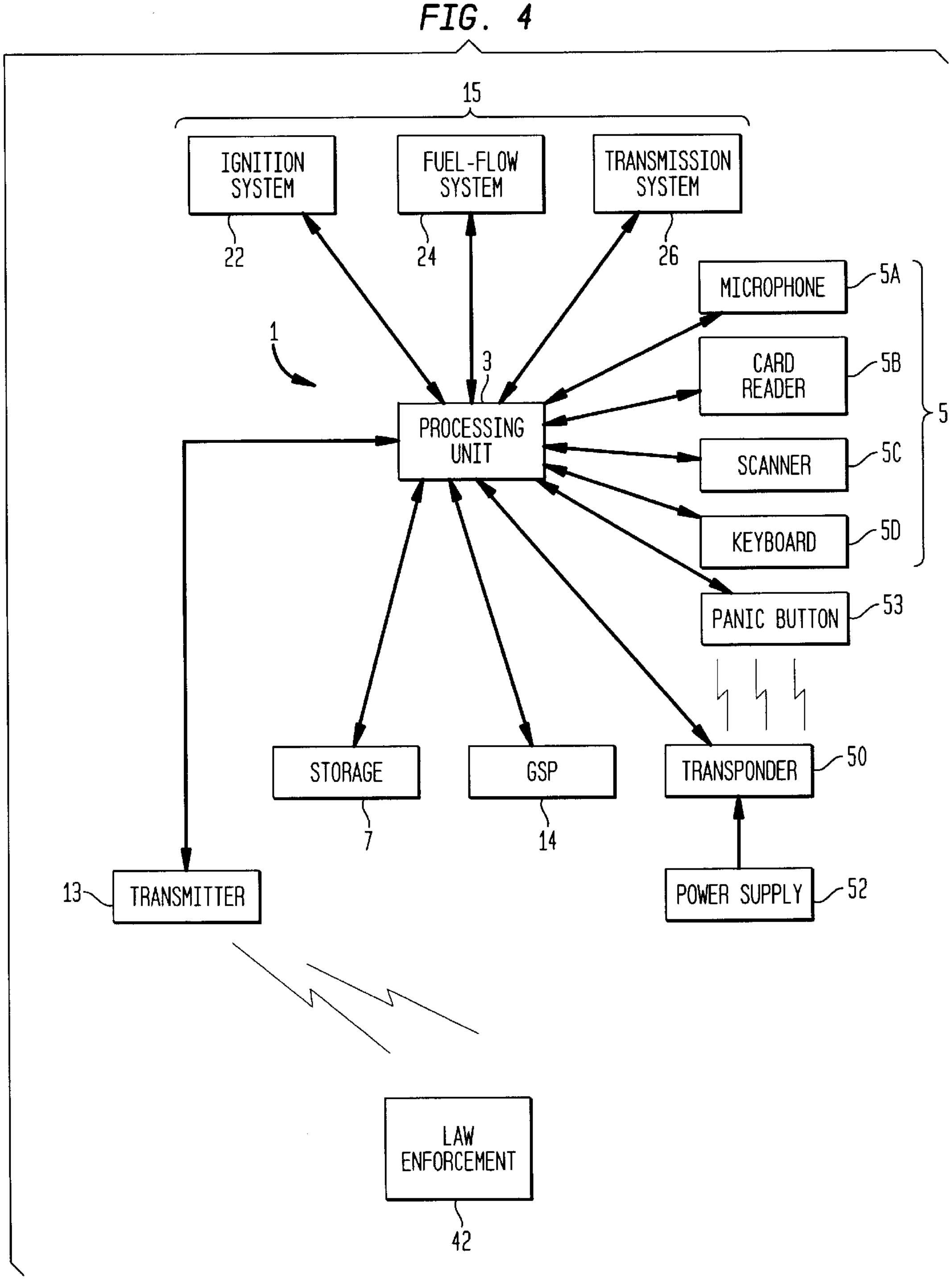
FIG. 4 is a system diagram of a unit used to deter the unauthorized use of a vehicle.

Referring now to FIG. 4, there is shown a system which is used to deter the unauthorized use of a vehicle and prevent theft of the same. In particular, a driver/owner of a vehicle will first set-up the system by storing the driver's physical data onto the data storage device 7. Such physical data may include the entry of a password via a keyboard, a driver's voice, a driver's retinal scan, a driver's hand print, or the like. The physical data may be retrieved from the driver/owner by the use of a keyboard, a microphone, a retinal scanner or a hand-scanner. The retrieved physical data may be stored onto the data storage device 7.

Referring to FIG. 2, upon entering the vehicle, the driver must download information from the first and second information cards 28, 30. As previously discussed, this may be accomplished, for example, by swiping the information cards 28, 30 through the card reader 5B. This information is then transmitted to the processing unit 3. Once the information from the information cards has been transmitted to the processing unit 3, the processing unit 3 then requests the information from the driver. By use of the visual display device 9 and/or auditory display device 11, the processing unit 3 may, for example, prompt the driver to recite a pre-determined phrase into a microphone 5A. With the use of voice recognition software known in the art, the processor compares the newly entered voice with that which is stored on the data storage device 7 by analyzing the voice patterns. Of course, the processing unit 3 may also request the driver to provide the input of a hand-print using a scanner SC, which may be a hand-scanner, or the input of a retinal scan using a scanner 5C, which may be a retinal scanner. These inputs would be compared in a manner similar to the voice comparison discussed above.

The processing unit 3 determines whether the drive is authorized to operate the vehicle. If the driver is not authorized to operate the vehicle, the processing unit 3 initiates a safety mode. The safety mode essentially disables the vehicle. In order to disable the vehicle, the processing unit, which is in communication with several, if not all, of the vehicle systems, transmits a control signal to certain vehicle systems. For example, a control signal sent to the unit controlling the fuel-flow system 24 may prevent any fuel from entering the engine of the vehicle. Another example may be where a control signal is sent to the unit that controls the ignition system 22 whereby disallowing the starting of the vehicle. One skilled in the art will realize that there are many methods to temporarily disable the vehicle. Upon the disablement of the vehicle, a transceiver 13 would alert the local authorities that there is an unauthorized use in progress by transmitting an alert signal. In addition, the system preferably includes a Global Positioning Satellite (GPS) unit 14. GPS data from the GPS unit 14 can also be routed by the processor unit 3 to transceiver 13 to be sent along to law enforcement as part of the alert signal. This will allow the local authorities to quickly locate the vehicle. The use and operation of GPS systems are well-known in the art and, therefore, the systems require no further discussion.

If the driver is authorized to operate the vehicle, the driver may choose to modify the vehicle's settings. For example, the driver/owner of the vehicle may choose to add or remove family members or friends from the list of drivers eligible to operate the vehicle. This feature is particularly useful for rental car businesses, which could grant access only to their rental customers and have access to real-time information regarding their customer's usage and driving patterns such as miles driven, amount of gas in tank, if driver was speeding, time engine has been shut-off, etc. In addition, the rental business can be provided with information as to the exact minute the vehicle was in the customer's possession and the exact minute it was dropped-off to the rental office. Each time a new customer rents a vehicle, the driver information could be updated by the rental company. This alleviates the problems associated with unauthorized friends and relatives operating the rental vehicle.

It is preferred, with reference to both of the embodiments of the present invention discussed above, that the processor 3 is mounted in such a position in the vehicle so that it is not visible and cannot easily be accessed by the driver or any person in the vehicle. The purpose of placing the processor 3 in such a manner is to deter anyone from tampering with the processor 3 in an unauthorized manner. Unauthorized tampering may include, for example, a person trying to power-down the system, reprogram the processor 3, physically damage the system, or the like.

As an additional safeguard, to deter or prevent the unauthorized tampering with the processor 3 or any other system component, it is preferred that the present invention automatically transmit a warning signal upon such tampering. Such a signal may be transmitted directly to a pre-determined local authority, a security agency, the police, or the like. In particular, the transmission of the tamper warning signal may preferably be sent by using the transceiver 13, previously discussed above. For example, if someone were to tamper with the data storage device 7 by attempting to store new information or delete existing information, a tamper signal could be sent to the processor 3 which would then send a tamper warning signal to the transceiver 13, which would ultimately transmit a tamper warning signal to the police.

Alternatively, a transponder 50, which is an art-recognized transceiver in that it contains both a transmitter and receiver, may be used to automatically transmit a signal when a pre-determined "trigger" is received by the transponder 50. The "trigger," which in an art-recognized manner is often in the form of a pulse, can be sent by the processor 3 upon the unauthorized tampering as discussed above. Other system components may also be set-up to send a "trigger" to the transponder 50 directly upon the tampering of each component. This may be accomplished using some type of wireless communication known in the art. The transponder 50 can be a separate unit not attached to the transmitter 13 previously discussed. In this manner, it can have a separate power supply 52. A separate power supply has advantage that it will not power-down if the power supply VDP powers-down. Furthermore, a separate unit allows for additional ease in hiding the transponder 50. This feature will assist in insuring the authenticity of the data in that a warning signal will be sent if any one attempts to manipulate of delete any of the data contained in the processor 3 or the data storage device 7. Furthermore, this will aid in preventing an override of the VDS 1 in that a warning signal will be transmitted upon any attempts to override the system.

In addition, the driver, while in the vehicle, may also choose to activate the transponder 50 which will contact the police and have the vehicle tracked in a situation where the vehicle is hijacked. This may be accomplished by having a panic button 53 which is in communication with the processing unit 3, in communication directly with the transponder 50, or both. The panic button 53 may be placed in a position easily accessible to the driver. If the panic button 53 is directly in communication with the processing unit 3, pressing the panic button 53 will cause a warning signal to be sent to the police, or the like, via the transceiver 13. In addition, since the processing unit 3 can also control the vehicle's systems 15, pressing the panic button 53 can also disable the vehicle within a reasonable distance so that the system 1 has sufficient time to alert the police or the authorities of the hijack in process. In addition, a driver may want to stop the vehicle as soon as possible without having the vehicle travel a reasonable distance. In such a case, the driver would have to, for example, press the panic button 53 twice. The processor 3 would be programmed to stop the car as soon as possible upon receipt of such an instruction. The use of the panic button 53 in conjunction with the system 1 will aid in reducing or preventing hijackings.

Figure 5:
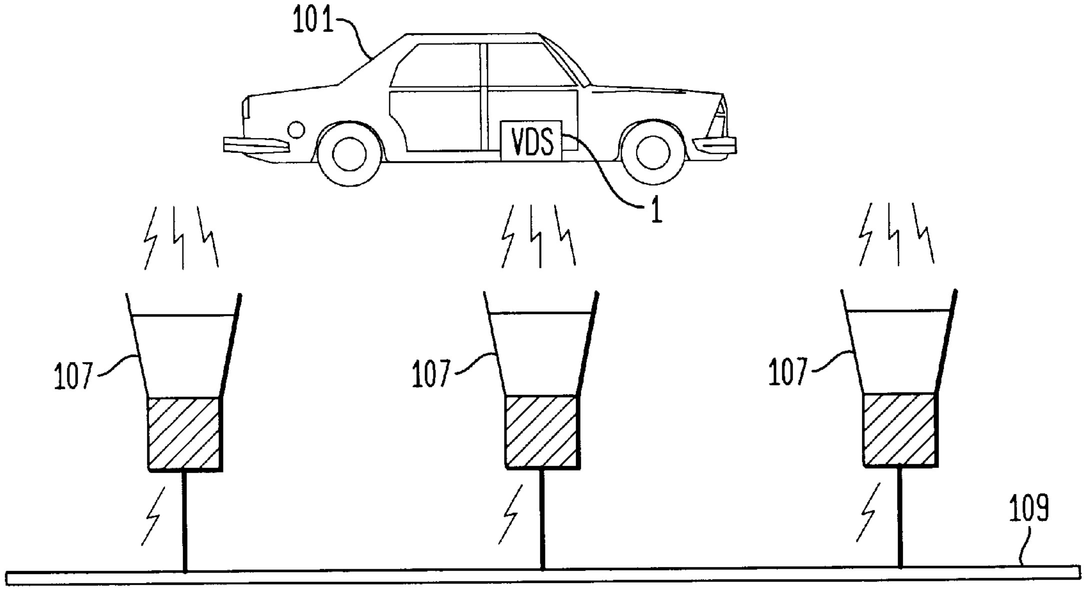
FIG. 5 is a system diagram of the networked sensors used to receive data from the Vehicle Data System.

Referring now to FIG. 5, there is shown the networked sensors 107 and transmission line 109 of the Highway Information System of the present invention which are used in conjunction with the VDS 1 contained in vehicle 101. The VDS 1 is capable of transmitting collected data such that networked sensors 107 receive such transmitted collected data. In the preferred embodiment sensors 107 are deployed along a roadway in such a manner that allows the sensors 107 to easily and effectively receive the transmitted collected data. The sensors 107 are networked together by transmission line 109. One skilled in the art will realize that the sensors 107 may be one of many types, such as, by way of non-limiting example, radio, infrared or ultrasonic transceivers or receivers, passive or active transponders, or other art-recognized sensors for collecting or exchanging data from a moving or stationary object. One skilled in the art will also recognize that the transmission lines 109 may be one of several types, for example, copper wire, fiber optic cables. In addition, it should be noted that the transmission line 109 may actually be wireless. In particular, wireless communication, such as, radio frequency (RF) and infrared radiation (IR), may be utilized.

Figure 6:
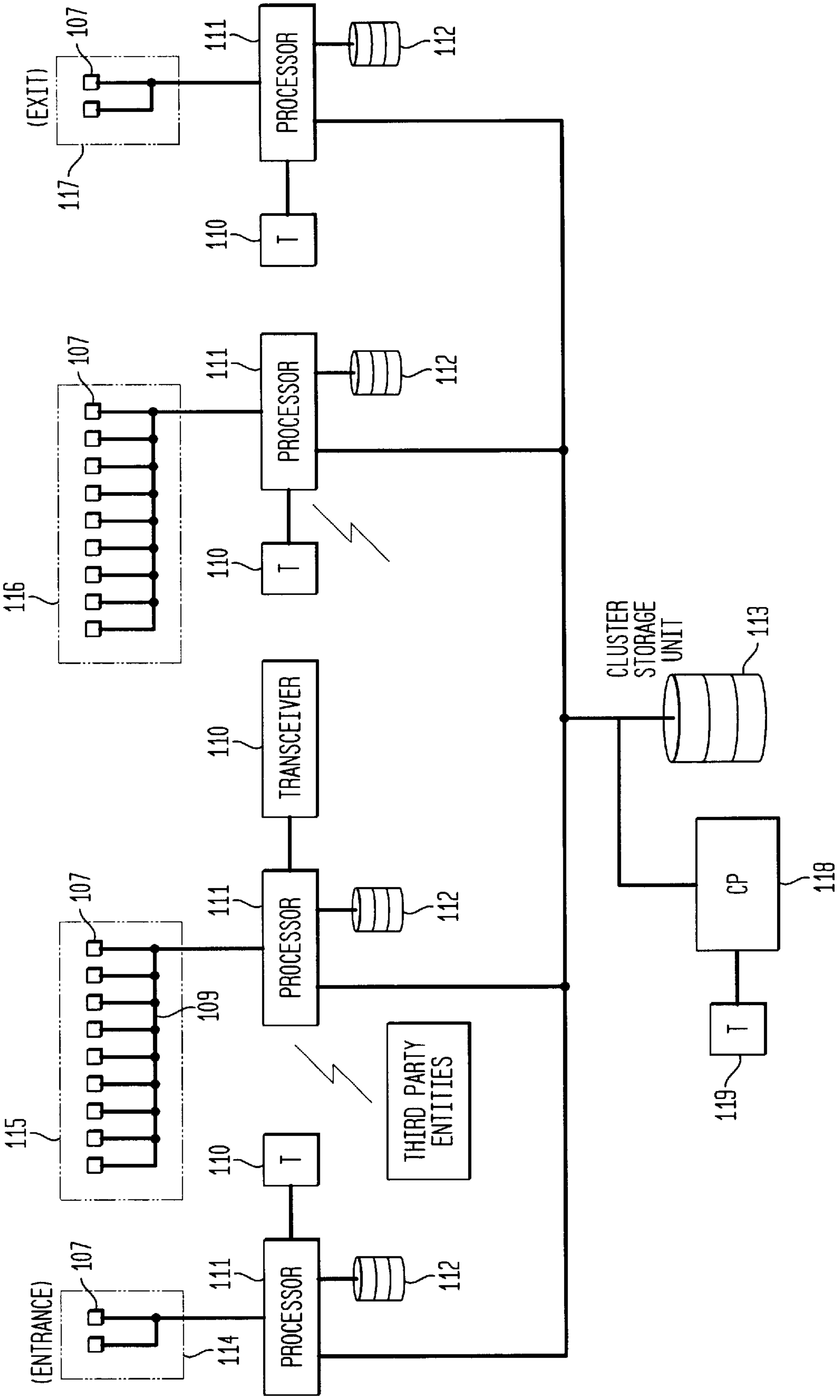
FIG. 6 is a system diagram of the Highway Information System.

Referring now to FIG. 6, there is shown a more detailed layout of the Highway Information System of the present invention. In particular, there is shown a first module 114, a second module 115, a third module 116 and a fourth module 117. The first module 114 contains sensors 107, a processor 111 and a local data storage unit such as module data storage unit 112. The collected data is received by processor 111 which may be one of the types previously discussed with respect to processor 3. The collected data received by the processor may be downloaded locally into module data storage unit 112. The collected data may also be downloaded directly from the processor 111 to a cluster data storage unit 113. In addition, the collected data may be transmitted directly to third party entities. In the preferred embodiment, the first module 114 is placed on or near the entrance of a highway or roadway. The sensors 107 of the first module 114 may be used to check whether the VDS 1 is operating properly. In addition, the first module 114 may also be used to check whether the driver and the passengers in the vehicle have the proper information cards 28–34. This is accomplished by the first module receiving a first set of vehicle data and driver data, i.e. collected data, from the VDS 1 and transmitting the same to the sensors 107 of first module 114. In the event that the VDS 1 is not operating properly or the driver/passengers did not insert the appropriate information cards into the VDS 1, the first module 114 will alert the proper authorities, for example, the police. The method by which the alert warning transmission will be transmitted to entities such as the police, will be discussed below shortly. In addition to sending the alert signals, the first module 114 also may transmit an enablement signal to the VDS 1 in order to power-on the VDS 1, i.e. awake it from sleep-mode. Once the VDS 1 is powered-on, it is able to transmit the collected data. The VDS 1 may stay powered-on until it is turned-off by the use of, for example, a timer. In the alternative, the VDS 1 may stay powered-on until it is turned-off by a signal transmitted from another module such as a module which may be located at an exit ramp of a highway or road. The fourth module 117, which will be discussed shortly, is the type of module that would be located at an exit ramp.

Once the vehicle 1 passes the first module 114, the vehicle next enters the second module 115. The second module 115 is essentially the same as the first module 114, except that the second module 115 would preferably contain several more sensors 107. As discussed above, since the VDS 1 has been powered-on, another set of collected data contained in the VDS 1 is capable of being transmitted to the sensors 107. The processor 111, contained in the second module 115, is able to receive the collected data and store it on module data storage 112 or directly to cluster data storage 113.

Next, the vehicle would go to the third module 116. The third module 116 is the same as the second module 115 but is shown for illustration purposes. In particular, in the preferred embodiment, the Highway Information System would include several modules such as the second module 115 and third module 116 along a highway or roadway so that these modules span virtually the entire length of the highway.

The fourth module 117 is essentially the same as the first module 114. The fourth module 117, however, would preferably be placed at or near the exit of a roadway or highway. The fourth module 117 is capable of receiving another set of vehicle data and driver data and is capable of transmitting a disablement signal in order to power-down the VDS 1, i.e., place the VDS 1 in a sleep-mode or stand-by mode. Modules 114–117 form one cluster used in the Highway Information System. As shown in FIG. 6, it is preferable that the modules 114–117 are networked together. In addition, it is preferable that the data collected from modules 114–117 be stored on cluster data storage 113. It should be noted that a cluster need not necessarily include a first module 114, a second module 115, a third module 116 and a fourth module 117. In fact, a cluster may contain any combination and number of the aforementioned modules. In the preferred embodiment, several clusters are networked together. It is preferable that several clusters are networked together whereby the data collected from the clusters may be stored onto a central database (not shown). It is envisioned that the networked clusters may span through town, city, state and interstate roadways and highways. In addition, the networked clusters may also span on an international level.

Further, it is envisioned that the networked modules will be arranged in a hierarchical manner as shown, for example, in FIG. 6.

Figure 7:
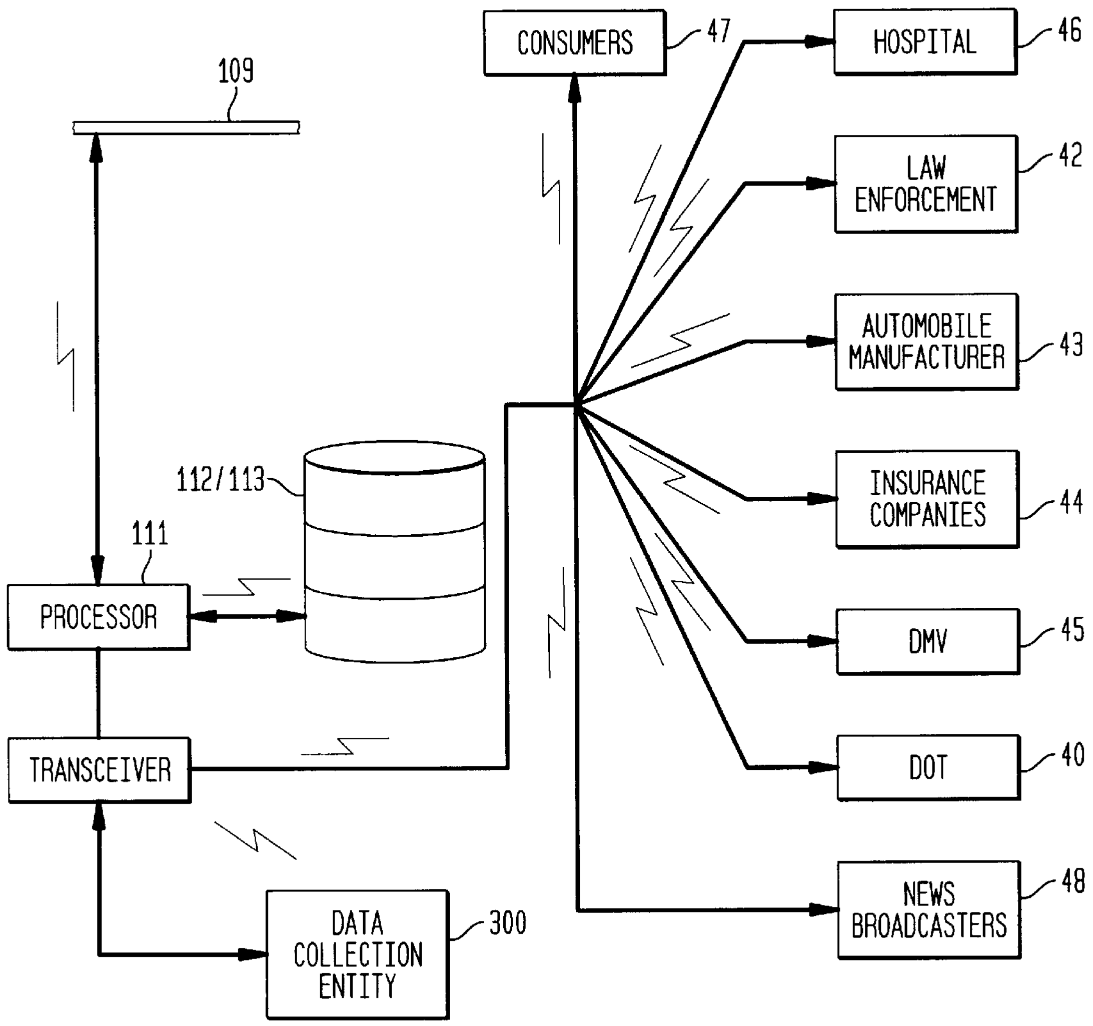
FIG. 7 is a system diagram of exemplary entities that may receive the collected data.

Referring now to FIG. 7, there is shown examples, which are in no way limiting, of some external third-party entities that may be interested in receiving the data collected from the sensors, i.e. vehicle data and driver data. Such entities may include, for example, hospitals 46, law enforcement agencies 42, vehicle manufacturers 43, insurance companies 44, the DMV 45, the DOT 40, repair shops, vehicle dealers, consumers 47, news broadcasters 48, to name a few.

Hospitals 46 may be interested in receiving the collected data because if, for example, a driver is involved in an accident, medical records which may consist of information regarding a driver's and/or passenger's name, blood type, medical history, next of kin, emergency contact numbers, insurance information, and the like, may be obtained by the hospital prior to the driver/passenger arriving at the hospital 46. This, of course, would prove beneficial in the sense that the hospital can prepare for the arrival of the patient accordingly. The data collected, of course, may be transmitted in real-time.

Law enforcement agencies, such as the police, may be interested in receiving collected data. For example, the police can get information, down to specific modules and clusters, as to which vehicles were speeding, or driving without valid registration, insurance, or license for example.

Vehicle dealerships may also be interested in receiving the collected data from the sensors 107 on a real-time basis. For example, a customer may enter a FORD™ dealership with the intent of purchasing a TAURUS™. Prior to making such a purchase, customers can get first-hand, up to the minute information regarding vehicle performance before they purchase a vehicle. This is particularly significant in that the vehicle performance information received by the customers is not provided by the dealerships trying to sell vehicles, but by a non-biased, independent source.

The collected data may also, of course, be acessed directly by the consumers 47 without having to involve other entities, such as vehicle dealerships. In this way, consumers may be able to sit at home at their computers and determine whether it is prudent, for example, to take a certain highway based on traffic conditions, or purchase a certain vehicle based on vehicle performance, or even to determine the location of their spouse's vehicle at a particular moment.

Insurance companies 44 would also benefit from receiving the collected data in that they would receive information not normally reported to insurance companies by drivers. Such information may include, for example, running red lights, running stop signs, vehicle self repairs, speeding, daily miles driven, and even whether the driver has insurance.

In addition, the DMV 45 would also benefit by saving time, money, and effort by requiring that only vehicles which need to be inspected are inspected. For example, if the collected data relating to the brakes and the exhaust of the vehicle is within the DMV guidelines, then the DMV may not need to inspect the vehicle.

Furthermore, those vehicles that need to be serviced or were involved in an accident may be called in for an inspection by the DMV prior to the scheduled date for such an inspection by the DMV. This is particularly helpful in that it would reduce, for example, the number of hazardous vehicles, vehicle breakdowns, wrecks on the road.

These entities may receive either real-time data or delayed data. In some instances, it may be necessary to have some data transmitted on a real-time basis. In such a situation, the Highway Information System would operate in the following manner. The data would be transmitted from the VDS 1 contained within a vehicle 101 to the networked sensors 114–117. The received data would then be sent to the processor 111. Thereafter, the processor 111 would be configured so that the data would be automatically transmitted, using the transceiver 110, to the proper external entities. This situation is particularly applicable in cases where an emergency signal must be transmitted from the VDS 1, for example, to the police or hospital 46.

In addition, external entities, such as hospitals 46, law enforcement 42, to name a couple, may want access to the collected data. Accordingly, the external entities may access the module data storage units 112 using transceiver 110, cluster data storage unit 113 using transceiver 119, or a central data storage unit (not shown). The entity requesting the collected data would decide whether to receive the collected data from module data storage unit 112, cluster data storage unit 113, or a central data storage unit based on the scope of the data requested. In particular, if an entity would like data relating to traffic congestion, accidents, environmental conditions such as fog and fire, or the like on a specific part of a road, for example, the entity would access the module data storage units 112. If the entity would like similar data relating to certain part of a highway with multiple modules, for example, the entity would access the cluster data storage units 113. Further, if the entity needed similar information relating to a certain state highway with several clusters, the entity may access a central data storage unit.

The information relating to traffic congestion, highway conditions, and highway/traffic reports of that nature may be transmitted directly to news broadcasters 48 such as radio stations and television stations so that it can, accordingly, be broadcasted on the news. Of course, the information can also be stored onto a central data storage unit so that media services such as the above-mentioned radio stations and television stations can access the same.

Also, vehicle manufacturers, vehicle repair shops, or the like, may want information such as frequency of vehicle repairs, vehicle malfunctions, driver complaints, and/or driver comments. This type of information, for example, may be retrieved from the vehicle systems 15, may be entered by the driver using a keyboard 5D, or both. Thereafter, the information may either be stored onto a central data storage unit to be accessed by or sent directly to the third-party entities as mentioned above.

Moreover, the data may be collected by a data collection entity 300 that could in turn sell any or all data collected to one or more of the entities described above.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. A system for collecting and storing data from a vehicle, comprising:

a sensor in communication with a roadway processor, said sensor sensing the presence of said vehicle and further receiving vehicle and driver data from a vehicle processor mounted in said vehicle; and said roadway processor receiving said vehicle and said driver data from said sensor.

2. A system according to claim 1 wherein said system further comprises a data storage unit in communication with said roadway processor for storing said vehicle and said driver data.

3. A system according to claim 2 wherein said system further comprises a receiver in communication with said roadway processor for allowing an external entity to access said data storage unit via said receiver.

4. A system according to claim 1 wherein said system further comprises a transmitter in communication with said roadway processor for transmitting said vehicle and said driver data to an external entity.

5. A system according to claim 1 wherein said sensor is deployed along a roadway.

6. A system for collecting and storing data from a vehicle comprising:

a first module comprising a first sensor and a first module processor, said first sensor being in communication with said first module processor, such that said first sensor is capable of sensing the presence of said vehicle;

a first module transmitter in communication with said first module processor and capable of transmitting an enablement signal to said vehicle to enable said vehicle to transmit a first set of said retrieved vehicle data to said sensor, and determine whether access to said vehicle is authorized; and a second module comprising a second sensor and a second module processor, said second sensor, being in communication with said second module processor, such that said second sensor is capable of sensing the presence of said vehicle and further capable of receiving a second set of vehicle and driver data from said vehicle, said second module processor capable of receiving said second set of vehicle and driver data from said second sensor.

7. The system according to claim 6 further comprising:

a first data storage unit, in communication with said first module processor, for storing said first set of vehicle and said driver data; and a second data storage unit, in communication with said second module processor, for storing said second set of vehicle and said driver data.

8. A system according to claim 7 further comprising a first receiver and a second receiver in communication with said first module processor and said second module processor for allowing an external entity to access said first module data storage unit and said second module data storage unit.

9. A system according to claim 6 further comprising:

a second module transmitter in communication with said second module processor for transmitting said second set of vehicle and driver data to an external entity; and said first module transmitter further capable of transmitting said first set of vehicle and driver data to said external entity.

10. A system according to claim 6 further comprising at least one sensor being deployed along a roadway.

11. A system for collecting and storing data from a vehicle, comprising:

a first module comprising a first sensor and a first module processor, said first sensor being in communication with said first module processor, such that said first sensor is capable of sensing the presence of said vehicle and further capable of receiving a first set of vehicle and driver data from said vehicle;

said first module processor capable of receiving said first set of vehicle and driver data from said first sensor; and a second module comprising a second sensor and a second module processor, said second sensor in communication with said second module processor, such that said second sensor is capable of sensing the presence of said vehicle and further capable of receiving a second set of vehicle and driver data from said vehicle, said second module processor capable of receiving said second set of vehicle and driver data from said second sensor.

12. The system according to claim 11 further comprising:

a first data storage unit, in communication with said first module processor, for storing said first set of vehicle data and driver data; and a second data storage unit, in communication with said second module processor, for storing said second set of vehicle and driver data.

13. A system according to claim 12 further comprising a first receiver in communication with said first module processor and a second receiver in communication with said second module processor for allowing an external entity to access said first data storage unit and said second data storage unit.

14. A system according to claim 11 further comprising a first transmitter in communication with said first module processor and a second transmitter in communication with said second module processor for transmitting said first and second set of vehicle and driver data to an external entity.

15. A system according to claim 14 wherein said external entity is a hospital capable of receiving said first and second set of driver data which comprises a medical record.

16. A system according to claim 14 wherein said external entity is a law enforcement agency capable of receiving said first and second set of vehicle and driver data.

17. A system according to claim 16 wherein said first and second set of vehicle and driver data comprises said vehicle's driver's name and address, driver's license identification number, and vehicle make and model.

18. A system according to claim 17 wherein said first and second set of vehicle and driver data further comprises vehicle speed information.

19. A system according to claim 16 wherein said first and second set of vehicle and driver data is selected from a group consisting of said vehicle's driver's name and address, driver's license identification number, license plate number, vehicle make and model, and vehicle speed information.

20. A system according to claim 14 wherein said external entity is a vehicle dealership capable of receiving said first and second set of vehicle data which comprises vehicle performance data.

21. A system according to claim 14 wherein said external entity is an insurance company capable of receiving said first and second set of vehicle and driver data.

22. A system according to claim 14 wherein said first and second set of vehicle and driver data comprises vehicle speeding information, vehicle accidents information, traffic violations information, and daily miles driven.

23. A system according to claim 14 wherein said external entity is a traffic reporting service capable of receiving said first and second set of vehicle data which comprises vehicle driving speed information and vehicle accident information.

24. A system according to claim 14 wherein said external entity is an entity selected from a group consisting of the Department of Motor Vehicles, the Department of Transportation, a vehicle repair shop, and a vehicle manufacturer.

25. A system according to claim 11 further comprising at least one sensor being deployed along a roadway.

26. A system for collecting and storing data from a vehicle, comprising:

a first module comprising a first sensor and a first module processor, said first sensor being in communication with said first module processor, such that said first sensor is capable of sensing the presence of said vehicle and further capable of receiving a first set of vehicle and driver data from said vehicle, said first module processor capable of receiving said first set of vehicle and driver data from said first sensor;

a second module comprising a second sensor and a second module processor, said second sensor being in communication with said second module processor, such that said second sensor is capable of sensing the presence of said vehicle, said second module processor capable of receiving said second set of vehicle and driver data from said second sensor; and a second module transmitter in communication with said second module processor and capable of transmitting a disablement signal to said vehicle to disable said vehicle from transmitting said second set of vehicle and driver data from said vehicle.

27. The system according to claim 26 further comprising:

a first data storage unit, in communication with said first module processor, for storing said first set of vehicle and driver data; and a second data storage unit, in communication with said second module processor, for storing said second set of vehicle and driver data.

28. A system according to claim 26 further comprising:

a first transmitter in communication with said first module processor for transmitting said first set of vehicle and driver data to external entities; and said second module transmitter further capable of transmitting said second set of vehicle and driver data to external entities.

29. A system according to claim 26 further comprising a first receiver and a second receiver in communication with said processor for allowing external entities to access said first data storage unit and said second data storage unit.

30. A system according to claim 26 further comprising at least one sensor being deployed along a roadway.

31. A method for collecting and storing data from a vehicle, comprising:

deploying a first module comprising a first sensor and a first module processor, said first sensor being in communication with said first module processor and capable of sensing the presence of said vehicle and further capable of receiving a first set of vehicle and driver data from said vehicle so that first module processor is capable of receiving said first set of vehicle data and driver data from said first sensor; and deploying a second module comprising a second sensor and a second module processor, said second sensor in communication with said second module processor and capable of sensing the presence of said vehicle and further capable of receiving a second set of vehicle and driver data from said vehicle so that said second module processor is capable of receiving said second set of vehicle and driver data from said second sensor;

storing said first and said second set of vehicle and driver data onto a data storage device; and transmitting said first and said second set of vehicle and driver data to a third-party entity.

32. A method of collecting, storing, selling and transmitting vehicle data comprising:

deploying a first module comprising a first sensor and a first module processor, said first sensor being in communication with said first module processor and capable of sensing the presence of said vehicle and further capable of receiving a first set of vehicle and driver data from said vehicle, such that said sensor is within a predetermined proximity to a path traversed by a vehicle from which data is to be collected;

deploying a second module comprising a second sensor and a second module processor, said second sensor in communication with said second module processor and capable of sensing the presence of said vehicle and further capable of receiving a second set of vehicle and driver data from said vehicle, said second module processor capable of receiving said second set of vehicle and driver data from said second sensor, such that said sensor is within a predetermined proximity to a path traversed by said vehicle from which data is to be collected;

storing said first and said second set of vehicle and driver data onto a data storage device;

selling said first and said second set of vehicle and driver data to a third-party entity; and transmitting said first and said second set of vehicle and driver data to said third-party entity.

* * * * *